United States Patent Office 3,242,080
Patented Mar. 22, 1966

3,242,080
HYPERBASIC METAL COMPLEX
Morris A. Wiley, Fishkill, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Mar. 20, 1963, Ser. No. 266,761
9 Claims. (Cl. 252—33)

This invention relates to a stable, oil dispersable, hyperbasic metal sulfonate composition and methods of making same. Such compositions increase detergency and reserve basicity in lubricating oils and therefore have found utility as additives therein. The overbased metal sulfonate compositions of this invention are also useful as corrosion inhibiting agents.

By hyperbasic sulfonate composition we mean the ratio of dispersed and/or combined metal equivalents to sulfonic acid equivalents in the resulting product is substantially above that present in a basic metal sulfonate, in other words a metal to acid equivalent ratio greater than 2:1. In example, a basic metal sulfonate formula for a monosulfonic acid alkaline earth metal salt can be written as $(RSO_3)$—Me—OH where $RSO_3$— stands for the sulfonic acid radical and Me for the basic metal. In the foregoing formula, there is one equivalent of sulfonic acid and two equivalents of basic metal giving an equivalent ratio of metal to acid of 2:1.

In the past, many ways have been developed in which to incorporate excess basic metal in an oil solution and maintaining said metal in a filtrable, dispersable state. These past methods have often been complex and of relatively high cost.

It is accordingly a principal object of this invention to provide, by simple and economical means, a hyperbasic metal sulfonate, lubricating oil concentrates thereof, and a process for the production of said sulfonates and concentrates.

Other objects of the invention will appear as the descriptions proceed.

Broadly stated, one aspect of the present invention may be described as the process for producing a stable, oil dispersable, hyperbasic metal alkarenelsulfonate composition by heating a mixture comprising an oil soluble sulfo compound (hydrocarbonsulfonic acid or normal or basic metal salt thereof) with a basic metal compound and a polar organic material, at a first elevated temperature and subsequently heating the reaction mixture at a second elevated temperature in an inert atmosphere.

More specifically, the method of the invention relates to forming a hyperbasic metal sulfonate comprising contacting a hydrocarbonsulfonic acid, or normal or basic metal salt thereof, with a basic metal compound and a polar organic compound, advantageously in an equivalent ratio of sulfo compound to basic compound to polar material of between about 1:3:2 and 1:10:9 at a first elevated temperature of between about 60 and 350° F., preferably 180° to 212° F., for a period of between about one-half and ten hours, preferably one and five hours, and subsequently fusing the reaction mixture in an inert atmosphere at a temperature of between 500° and 800° F., preferably between 550° and 700° F. for a period of between 1 minute and 5 hours, and preferably between 5 and 60 minutes. The inert atmosphere is normally supplied by introducing an inert gas such as nitrogen, argon, neon, methane and ethane over or into the reaction mixture when heating to the second elevated temperature is commenced. An inert atmosphere may also be accomplished by a vacuum operation. The rate of inert gas blowing can be of the order of 0.1 or 1.0 liter per minute through a volume of from 0.1 to 5.0 liters of ingredients.

The purpose of having an inert atmosphere is to prevent the atmosphere from causing oxidation or liberation of the polar material as such from the complex.

In the final product undissolved bodies are removed by standard means such as filtration.

Under preferred conditions diluent is employed such as lube oil and volatile inert organic solvent, the volatile organic solvent being removed prior to the reaching of the second elevated temperature. The presence of lube oil and volatile organic solvent facilitates the interaction between the sulfo reactant, basic metal compound and polar material. Also, the presence of lube oil diluent permits the production of the hyperbasic sulfonate in a concentrate form which is suitable for direct incorporation into lubricating oils. Still further, water is also desirably employed in the reaction to further promote the reactiveness of the sulfo, basic metal and polar materials. Generally up to an equal amount and preferably between about 1 and 10 wt. percent of water based on the charge materials was found to be helpful. Under preferred conditions the ratio of reactant material is chosen such that the total equivalents of the metal base will equal the total equivalents of the sulfo compound plus the polar organic material.

Although the exact reaction mechanism has not been specifically determined, it is theorized that during the first heating step, the basic metal compound, the sulfo reactant, and polar organic material react to form salt complexes. Then at the second elevated temperature the polar organic material in the salt complexes decomposes in part to promote the formation of metal carbonate. The components of the resultant metal carbonate-modified complex salt combination are in such chemical and physical relationship to one another that even though the metal to sulfo equivalent ratio is substantially greater than 2:1 the product when diluted in mineral oil is dispersable and forms a filtrable product in said dispersion. It is to be noted in respect to the second elevated temperature that at reaction temperatures below 500° F. the polar material in the complex will not decompose to produce the metal carbonate-modified complex salt combination in any measurable amount. Further reaction temperatures above 800° F. tend to decompose said combination.

Sulfo reactants useful in our process include the oil soluble hydrocarbonsulfonic acids. Specific examples are the petroleum sulfonic acids such as mahogany sulfonic acid, alkylated aromatic hydrocarbonsulfonic acid, petrolatumsulfonic acid, paraffin-waxsulfonic acid, petroleum naphthenesulfonic acid, polyisobutenesulfonic acid, alkyl substituted benzenesulfonic acids, alkyl substituted naphthalenesulfonic acids, alkyl substituted cyclohexanesulfonic acids and mixtures of the foregoing. The normal and basic metal salts of the foregoing acids are also included such as the alkali metal, alkaline earth metal, magnesium, cadmium, zinc, tin, lead and manganese salts. One preferred sulfo reactant is a sulfonic acid which has been derived from the sulfonation of a petroleum fraction or synthetic hydrocarbon. It will normally be a monosulfonic acid having a molecular weight between about 400 and 550 but the molecular weight of a hydrocarbonsulfonic acid can be as low as 350 for making sufficiently oil soluble sulfonates or as high as 1500. By oil soluble we mean soluble in a conventional mineral lubricating oil fraction to the extent of at least 5 wt. percent. One of the best sulfonate dispersants is formed from a petroleum sulfonic acid having an average molecular weight of about 400 to about 500. However, synthetic sulfonates derived from alkylated benzene or naphthalene are also excellent.

The basic reacting inorganic metal compounds which are employed include the oxides, hydroxides and carbonates of alkali and alkaline earth metals, magnesium, zinc, cadmium, tin, lead and manganese. The preferred metal compounds, based on their comparative usefulness, are the oxides and hydroxides of barium, calcium, magnesium, sodium, potassium and lithium.

Examples of the polar organic materials contemplated herein are the saturated aliphatic hydrocarbon alcohols containing from 1 to 5 hydroxy groups, preferably 1 to 3 hydroxy groups, alkanones, fatty acids, primary alkyl amines, aryl substituted and alkaryl substituted alkanols, phenol, alkylated phenols, saccharides, carbohydrates, animal and vegetable fats and oils. The contemplated polar materials normally have from 1 to 30 carbons. Specific examples of the polar organic materials contemplated herein are methanol, dodecanol, glycerol, pentaerythritol, benzyl alcohol, methyl benzyl alcohol, phenol, dodecyl amine, octadecyl amine, methyl undecyl ketone, a mixture of $C_{18}$ to $C_{21}$ tertiary alkyl primary amines, sucrose, cellulose, fish oil, olive oil, butter fat.

The base oils which are desirably employed in the process of the invention to form the hyperbasic metal sulfonate composition concentrates include the hydrocarbon oils. The hydrocarbon oils can be paraffin base, naphthene base, or mixed paraffin-naphthene base distillate or residual oils. Broadly speaking, mineral lubricating oils having an SUS viscosity at 100° F. between 50 and 3000, preferably between 70 and 300, are employed. It is to be noted the concentrate may contain up to 75 wt. percent hyperbasic sulfonate.

The volatile petroleum solvent which is employed under preferred conditions in the first stage of the process include aliphatic and aromatic hydrocarbons having less than about 10 carbon atoms such as benzene, toluene, hexane, cyclohexane, pentane, and naphtha.

When the overbased product of the invention is utilized as an additive in lubricating oils, it may be present in amounts ranging from about 1 to 10 wt. percent of the lubricating oil composition. However, it should be understood that larger or smaller amounts may be used, if desired, between the ranges of 1 and 25 wt. percent, the amount depending in part on the base number and particular application to which the finished composition is to be put. Examples of the contemplated lubricating oils are the hydrocarbon oils of the type described for preparation of the concentrate or synthetic oils such as 2-ethylhexyl sebacate and polyethylene oxide.

The following examples further illustrate the invention but are not to be taken as limitations thereof.

*Example I*

To a reactor fitted with a reflux condenser and stirrer, there was charged 30.5 grams (0.370 mole) glycerol, 124 grams of a mineral oil solution containing 0.25 moles petroleum sulfonic acid (approx. 450 M.W.) in 216 grams of "isoheptane," 77 grams (0.5 moles) barium oxide and 248 grams of a mineral oil having an API gravity of 18.8 and a SUS viscosity at 130° F. of 48. "Isoheptane" is a petroleum solvent with the approximate boiling range of a mixture of heptanes. The mixture was heated to a temperature of 195° F. under reflux conditions for a period of one hour. The condenser was removed and the temperature was elevated to 250° F. to distill the solvent and the reaction mixture was then fused for five minutes at 650° F. with nitrogen blowing at 0.5 liter per minute. The fused product was filtered to produce a clear, bright product and analyzed and found to be of the following properties:

| Test: | Found |
|---|---|
| Total barium, wt. percent | 14.5 |
| $CO_2$, wt. percent | 2.8 |
| Neut. No. (alkaline) | 5.7 |
| Equivalent ratio, $Ba/RSO_3$— | 4.0/1 |

It was calculated this mixture contained about 12.5 wt. percent dispersed barium carbonate (basis carbon dioxide analysis) and about 0.87 wt. percent dispersed barium hydroxide (basis alkaline neutralization number).

*Example II*

To a one liter flask fitted with a reflux condenser and stirrer there was added 54.5 grams (0.5 mole) benzyl alcohol, 337 grams of an "isoheptane" solution containing 124 grams mineral oil solution containing 0.25 mole petroleum sulfonic acid (450 M.W.), 77 grams (0.5 mole) barium oxide, 81 mls. water and 229 grams of mineral oil having an SUS viscosity at 100° F. of 1574 and an API gravity of 18.8°. The mixture was heated with stirring to 250° F. for a period of 1 hour. At the end of this period, nitrogen was blown through the reaction mixture at a rate of 0.5 liter per minute and the reaction mixture was heated at 650° F. for a period of five minutes. The residual fused product was filtered to produce a clear, bright product and analysis of the product found the following:

| Test: | Found |
|---|---|
| Total barium, wt. percent | 14.85 |
| $CO_2$, wt. percent | 3.64 |
| Neut. No. (alkaline) | 27 |

It was calculated that this product contained about 16.3% (wt.) dispersed $BaCO_3$ ($CO_2$ basis).

*Example III*

The procedure of Example II was repeated with the exception that 93 grams (0.5 mole) dodecyl alcohol was substituted for benzyl alcohol and 190 grams of mineral oil was employed rather than 229 grams.

The clear, bright product analyzed as follows:

| Test: | Found |
|---|---|
| Total barium, wt. percent | 10.5 |
| $CO_2$, wt. percent | 2.2 |
| Neut. No. (alkaline) | 9.0 |
| Basic barium, wt. percent | 9 |
| Equivalent ratio, $Ba/RSO_3$— | 6/1 |

It was calculated that this product contained about 9.9 wt. percent dispersed $BaCO_3$ (basis $CO_2$).

*Example IV*

The procedure of Example II was repeated with the following exception. 221 grams (0.5 equivalent) of Primene JMT, a mixture of tertiary alkyl primary amine ($C_{18}$ to $C_{21}$), were substituted for the benzyl alcohol, 375 grams of a mineral oil solution containing 0.25 mole petroleum sulfonic acid, and 248 grams of mineral oil (48 SUS at 130° F.) were employed.

The clear, filtered bright product obtained analyzed as follows:

| Test: | Found |
|---|---|
| Total barium, wt. percent | 8.72 |
| $CO_2$, wt. percent | 0.49 |
| Neut. No. (alkaline) | 18.0 |
| Nitrogen, wt. percent | 0.23 |

It was calculated that this product contained about 2.2 wt. percent $BaCO_3$ (basis $CO_2$) and 2.7 wt. percent $Ba(OH)_2$ (basis alkaline Neut. No.).

*Example V*

To a 1 liter flask fitted with a stirrer, reflux condenser and gas inlet tube, there was added 39.6 grams (0.2 mole) methyl undecyl ketone, 31 grams (0.2 mole) barium oxide, 114 grams (0.1 mole) basic barium petroleum sulfonate ($RSO_3$—Ba—OH) of a molecular weight of 450, 115 grams of a mineral oil having an API gravity of 29.6° and an SUS viscosity of 99.5 at 100° F. and 26 grams of methanol. The mixture was heated to 70° F. and refluxed at that temperature for two hours with stirring. At the end of the two hour period, nitrogen was introduced into the reaction zone at the rate of 1 liter per minute and the reaction mixture was heated at 575° F. for a 4 hour period. The residue was filtered to produce a clear, bright product and analysis of said product found the following:

Test: Found
- Total barium, wt. percent — 21.3
- $CO_2$, wt. percent — 3.6
- Neut. No. (alkaline) — 30.1
- Basic barium, wt. percent — 15.13
- Equivalent ratio, $Ba/RSO_3$— — 3.5/1

It was calculated this product contained 16.2 wt. percent dispersed barium carbonate (basis $CO_2$) and 4.5 wt. percent $Ba(OH)_2$ (basis alkaline Neut. No.).

*Example VI*

One sunfish weighing 20 grams was pulverized for 15 minutes in a blender with 100 grams of mineral oil having an SUS viscosity at 130° F. of 48 and an API gravity of 18.8°. An additional 20 grams of said mineral oil, 30 grams (0.2 mole) of barium oxide, 49 grams (0.1 mole basis Neut. No.) of petroleum sulfonic acid (450 M.W.) mineral oil concentrate and 85 grams of "isoheptane" were added. The blending was continued for an additional 2 minutes. The resultant mixture was heated to 300° F. The mixture was then blown with nitrogen at a rate of 1 liter/minute and rapidly heated to 650° F. with stirring. The 650° F. temperature was maintained for 5 minutes. The residue was filtered to produce a clear product and analysis of said product found the following:

Test: Found
- Total Ba, wt. percent — 12
- $CO_2$, wt. percent — 1.91
- Neut. No. (alkaline) — 16
- Basic barium, wt. percent — 9.02
- Equivalent ratio $Ba/RSO_3$— — 3.5/1

It was calculated that this product contained 50 wt. percent of the barium present as dispersed barium carbonate (based on $CO_2$) and about 16 wt. percent of the barium present in the form of dispersed barium hydroxide (based on alkaline Neut. No.).

We claim:

1. A process for preparing a hyperbasic metal complex which comprises heating a mixture of a sulfo compound selected from the group consisting of oil soluble hydrocarbonsulfonic acid and alkali metal, alkaline earth metal, magnesium, zinc, cadmium, tin, lead, and manganese salts thereof; a basic compound selected from the group consisting of hydroxides, oxides, and carbonates of alkali metal, alkaline earth metals, magnesium, zinc, cadmium, tin, lead, and manganese and a polar material selected from the group consisting of saturated aliphatic hydrocarbon alcohols containing from 1 to 5 hydroxyl groups, alkanones, aryl and alkaryl substituted alkanols, phenol, alkylated phenol, primary alkyl monoamines, animal and vegetable fats and oils and mixtures thereof of less than 30 carbons at a first elevated temperature of between about 60 and 350° F. and subsequently heating said mixture to a second elevated temperature of between 500 and 800° F. in the presence of an inert atmosphere, the equivalent ratio of said sulfo compound to said basic compound to said polar material in said mixture being between about 1:3:2 and 1:10:9.

2. A process in accordance with claim 1 wherein there is also included in said mixture a lubricating oil having an SUS viscosity at 100° F. of between about 50 and 3000.

3. A process in accordance with claim 1 wherein said mixture also including a mineral lubricating oil of a SUS viscosity between about 50 and 3000 at 100° F., and a volatile hydrocarbon solvent having less than 10 carbon atoms and water.

4. A process in accordance with claim 3 wherein said sulfo compound is petroleum sulfonic acid of a molecular weight of about 450, said basic compound is barium oxide, and said polar material is glycerol.

5. A process in accordance with claim 3 wherein said sulfo compound is petroleum sulfonic acid of a molecular weight of about 450, said basic compound is barium oxide, and said polar material is benzyl alcohol.

6. A process in accordance with claim 3 wherein said sulfo compound is petroleum sulfonic acid of a molecular weight of about 450, said basic compound is barium oxide, and said polar material is dodecyl alcohol.

7. A process in accordance with claim 3 wherein said sulfo compound is a petroleum sulfonic acid of an average molecular weight of 450, said basic compound is barium oxide, and said polar material is a mixture of tertiary alkyl primary amines of 18 to 21 carbons.

8. A process in accordance with claim 3 wherein said sulfo compound is a petroleum sulfonic acid of an average molecular weight of about 450, said basic compound is barium oxide and said polar material is fish oil and fat.

9. A process in accordance with claim 3 wherein said sulfo compound is a basic barium petroleum sulfonate of an average molecular weight of about 450, said basic compound is barium oxide, said polar compound is methyl undecyl ketone and methanol.

References Cited by the Examiner

UNITED STATES PATENTS

| 2,695,910 | 11/1954 | Asseff et al. | 252—33 |
| 2,889,279 | 6/1959 | Carlyle et al. | 252—33 |
| 3,027,325 | 3/1962 | McMillen et al. | 252—33 |
| 3,057,896 | 10/1962 | Schlicht et al. | 252—33 |

DANIEL E. WYMAN, *Primary Examiner.*